(12) United States Patent
Krolak et al.

(10) Patent No.: US 12,176,960 B2
(45) Date of Patent: Dec. 24, 2024

(54) COMMUNICATION SYSTEMS FOR POWER SUPPLY NOISE REDUCTION

(71) Applicant: International Business Machines Corporation, Armonk, NY (US)

(72) Inventors: David J. Krolak, Rochester, MN (US); Daniel Mark Dreps, Georgetown, TX (US); Erik English, Salt Point, NY (US); Jieming Qi, Austin, TX (US); Michael Sperling, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 18/045,006

(22) Filed: Oct. 7, 2022

(65) Prior Publication Data

US 2024/0121013 A1   Apr. 11, 2024

(51) Int. Cl.
*H04B 15/00* (2006.01)
*H04L 7/00* (2006.01)

(52) U.S. Cl.
CPC ......... *H04B 15/005* (2013.01); *H04L 7/0079* (2013.01)

(58) Field of Classification Search
CPC ..... G11C 7/02; H03M 1/0863; H03K 17/693; H04B 15/005; H04L 7/0079
See application file for complete search history.

(56) References Cited

U.S. PATENT DOCUMENTS

| 6,684,350 B1 * | 1/2004 | Theodoras, II ........... H04L 1/24 714/713 |
| 6,816,939 B2 | 11/2004 | Bandholz et al. |
| 7,339,396 B1 | 3/2008 | Akram |

(Continued)

FOREIGN PATENT DOCUMENTS

| CN | 106105120 A | 11/2016 |
| CN | 112290922 A | 1/2021 |

OTHER PUBLICATIONS

Chen et al., "Register binding and port assignment for multiplexer optimization." ASP-DAC 2004: Asia and South Pacific Design Automation Conference 2004 (IEEE Cat. No. 04EX753). IEEE, 2004.

(Continued)

*Primary Examiner* — Sophia Vlahos
(74) *Attorney, Agent, or Firm* — Patterson + Sheridan, LLP

(57) ABSTRACT

Method and apparatus for transferring a data signal including receiving a digital data signal by a first data input of a transmitter multiplexer; inverting the digital data signal by a first inverter, thereby providing an inverted digital data signal; receiving the inverted digital data signal by a first inverted data input of the transmitter multiplexer; counting, by a first counter, a clock signal; transmitting, by the first counter and in response to the first counter counting a threshold number of clock cycles, a first selection signal to a first selection signal input of the transmitter multiplexer; and alternately transmitting, in response to the first selection (Continued)

signal and by a first digital data signal output of the transmitter multiplexer, the digital data signal and the inverted digital data signal as the transmitter output signal to a receiver, the receiver and the digital data signal output operably coupled to a data link.

18 Claims, 9 Drawing Sheets

(56) References Cited

U.S. PATENT DOCUMENTS

| | | | |
|---|---|---|---|
| 7,436,215 B2* | 10/2008 | Drottar | H03F 3/60 327/108 |
| 7,724,044 B1 | 5/2010 | Rasmussen | |
| 7,945,050 B2 | 5/2011 | Mozak | |
| 8,493,300 B2 | 7/2013 | Santo et al. | |
| 8,689,018 B2 | 4/2014 | Prathaban et al. | |
| 8,736,243 B2 | 5/2014 | Gizara | |
| 8,923,417 B1 | 12/2014 | Li et al. | |
| 9,247,868 B2 | 2/2016 | Ogura | |
| 9,287,868 B1 | 3/2016 | Patil et al. | |
| 9,319,040 B2 | 4/2016 | Dinh et al. | |
| 9,548,834 B2 | 1/2017 | Roorda et al. | |
| 9,716,508 B1* | 7/2017 | Zhang | H03M 1/0678 |
| 10,103,626 B1 | 10/2018 | Narayanan et al. | |
| 10,401,900 B2 | 9/2019 | Leibowitz et al. | |
| 11,115,245 B2 | 9/2021 | Saeki | |
| 2003/0076779 A1 | 4/2003 | Frank et al. | |
| 2004/0103441 A1 | 5/2004 | Williams | |
| 2009/0248945 A1 | 10/2009 | Navaratnam et al. | |
| 2014/0105101 A1 | 4/2014 | Vu et al. | |
| 2014/0143586 A1* | 5/2014 | Dalumi | G06F 1/14 713/600 |
| 2014/0226708 A1* | 8/2014 | Yang | H03K 7/08 375/238 |
| 2014/0247834 A1 | 9/2014 | Poulsen | |
| 2015/0185809 A1 | 7/2015 | Bharadwaj et al. | |
| 2018/0054336 A1* | 2/2018 | Hori | H04L 7/0008 |
| 2018/0115312 A1 | 4/2018 | Ong | |
| 2020/0027518 A1 | 1/2020 | Caraher et al. | |
| 2021/0149468 A1 | 5/2021 | Walsh | |
| 2021/0287725 A1 | 9/2021 | Bringivijayaraghavan et al. | |
| 2021/0407561 A1 | 12/2021 | Takefman et al. | |
| 2022/0011978 A1 | 1/2022 | Lee et al. | |
| 2024/0121072 A1* | 4/2024 | Krolak | H04L 7/0012 |

OTHER PUBLICATIONS

Bhattacharjee et al. "Efficient implementation of multiplexer and priority multiplexer using 1S1R ReRAM crossbar arrays." 2016 IEEE 59th International Midwest Symposium on Circuits and Systems (MWSCAS). IEEE, 2016.

Kianpour et al., "Optimized Design of Multiplexor by Quantum-dot CellularAutomata." International Journal of Nanoscience and Nanotechnology 9.1 (2013): 15-24.

Aslam et al., "Parallel packet switching using multiplexors with virtual input queues." 27th Annual IEEE Conference on Local Computer Networks, 2002. Proceedings. LCN 2002 . . . . . IEEE, 2002.

Drechsler et al.,"MuTaTe: An efficient design for testability technique for multiplexor based circuits." Proceedings of the 13th ACM Great Lakes symposium on VLSI. 2003.

China National Intellectual Property Administration, International Search Report and Written Opinion for PCT Application No. PCT/CN2023/119977, dated Jan. 3, 2024.

China National Intellectual Property Administration, International Search Report and Written Opinion for PCT Application No. PCT/CN2023/119984, dated Jan. 2, 2024.

"List of IBM Patents or Patent Applications Treated As Related," for U.S. Appl. No. 18/045,006, filed Oct. 7, 2022.

* cited by examiner

Alternately transmitting, in response to the first selection signal and by a digital data signal output of the transmitter multiplexer, the digital data signal and the inverted digital data signal to the receiver
610

Alternately receiving, by a first input of a receiver multiplexer, the digital data signal and the inverted digital data signal from the transmitter
702

Receiving, by a second input of a receiver multiplexer, an inverted signal version of the digital data signal or the inverted digital data signal that was received in step 702
704

Transmitting, by the receiver counter and in response to the receiver counter counting a threshold number of clock cycles, a second selection signal to a selection signal input of the receiver multiplexer
706

Providing, in response to the second selection signal and by a digital data signal output of the multiplexer, the digital data signal
708

COMMUNICATION SYSTEMS FOR POWER SUPPLY NOISE REDUCTION

BACKGROUND

The present invention relates to data transfer techniques, and more specifically, to data transfer techniques over one or more data links.

A data link is an interconnect between agents, where in a given data transaction one agent is a "transmitter" and the other agent is a "receiver". Example data links may be arranged between a processor and a disk drive, processors on separate boards in a computer system, and/or processors on the same board or package, among other examples. For the two agents to communicate, both agents agree on the timing for sending and receiving data. This agreement is commonly known as the clocking scheme in link design.

For example, in a "common clock" scheme, all components in the interconnect share a single clock when sending and receiving data. In a "source synchronous" clocking scheme, the clock signal is sent along with the data signal. An "embedded" clocking scheme embeds the clock signal in the data transfer, but not without drawbacks including the need for clock-data recovery circuitry and bandwidth limitations. Within a given clocking scheme, a transmission protocol defines when transmitters send data and when receivers sample the transmitted data.

Transmission protocols may include techniques for idling an agent that may not have data to transmit or otherwise in an idle state, but said idling introduce various delays, data overhead, and complexity.

SUMMARY

According to a first embodiment of the present invention, a method includes receiving a digital data signal by a first input of a multiplexer of a transmitter operably coupled to a data link; transmitting, by a digital data signal output of the multiplexer, the digital data signal to a receiver that is operably coupled to the data link; receiving, by a selection signal input of the multiplexer, a first selection signal that indicates an idle mode for the transmitter; receiving, by a second input of the multiplexer, a patterned data signal; and transmitting, by the digital data signal output and in response to the first selection signal, the patterned data signal to the receiver.

In a first aspect of the first embodiment, the method further includes intermittently communicating the patterned data signal to the second input, thereby reducing a switching rate of the patterned data signal received by the second input of the multiplexer.

In a second aspect, in combination with the first embodiment and/or aspects thereof, the method further includes receiving, by the selection signal input of the multiplexer, a second selection signal that indicates a data signal transmission mode for the transmitter, and the transmitting the digital data signal step including transmitting, in response to the second selection signal, the digital data signal to the receiver.

In a third aspect, in combination with the first embodiment and/or aspects thereof, the method further includes selecting, based on the digital data signal, the idle mode for the transmitter. In a fourth aspect, the selecting step includes selecting, based on a switching activity value of the digital data signal, the idle mode for the transmitter. In a fifth aspect, the selecting step includes detecting at least one of an idle flit of the digital data signal and an idle phit of the digital data signal and selecting, based on at least one of the idle flit and idle phit, the idle mode for the transmitter.

In a sixth aspect, in combination with the first embodiment and/or aspects thereof, a first processor includes the transmitter and a second processor includes the receiver.

According to a second embodiment of the present invention, a method includes receiving a digital data signal by a first data input of a transmitter multiplexer; inverting the digital data signal by a first inverter, thereby providing an inverted digital data signal; receiving the inverted digital data signal by a first inverted data input of the transmitter multiplexer; counting, by a first counter, a clock signal; transmitting, by the first counter and in response to the first counter counting a threshold number of clock cycles, a first selection signal to a first selection signal input of the transmitter multiplexer; and alternately transmitting, in response to the first selection signal and by a first digital data signal output of the transmitter multiplexer, the digital data signal and the inverted digital data signal as the transmitter output signal to a receiver, the receiver and the digital data signal output operably coupled to a data link.

In a first aspect of the second embodiment, the receiver includes a second counter and a receiver multiplexer arranged for receiving the transmitter output signal, the method further including receiving the transmitter output signal by a second data input of the receiver multiplexer; inverting, by a second inverter, the transmitter output signal, thereby providing an inverted transmitter output signal; receiving the inverted digital data signal by a second inverted data input of the receiver multiplexer; counting, by a second counter, the clock signal; transmitting, by the second counter and in response to the second counter counting the threshold number of clock cycles, a second selection signal to a second selection signal input of the receiver multiplexer; and alternately providing, in response to the selection signal and by a second digital data signal output of the receiver multiplexer, the transmitter output signal and the inverted transmitter output signal.

In a second aspect of the second embodiment, the counting step by the first counter includes counting, by the first counter, each occurrence of the threshold number of counted clock cycles and provide the first selection signal in response to each occurrence of the threshold number of counted clock cycles and the counter step by the second counter including counting, by the second counter, each occurrence of the threshold number of counted clock cycles and provide the second selection signal in response to each occurrence of the threshold number of counted clock cycles.

In a third aspect of the second embodiment, in combination with the second embodiment and/or aspects thereof, the method further includes synchronizing the first counter and the second counter. In a fourth aspect, in combination with the second embodiment and/or aspects thereof, a first processor includes the transmitter multiplexer and a second processor includes the receiver multiplexer.

As described herein, the first and second embodiments and aspects thereof may be combined in further embodiments.

According to a third embodiment of the present invention a system includes a data link; a receiver operably coupled to the data link; a memory that contains data for generating a patterned data signal; and a transmitter operably coupled to the data link and the memory, the transmitter arranged for transmitting a digital data signal and including a multiplexer that includes a first input arranged for receiving the digital data signal, a second input arranged for receiving the patterned data signal, a selection signal input arranged for receiving a mode selection signal, and a digital data signal output arranged for transmitting a multiplexer output signal to the data link, the multiplexer adapted to selectively output the digital data signal and the patterned data signal as the multiplexer output signal in response to receiving the mode selection signal, the mode selection signal representative of an idle mode of the transmitter and a data signal transmission mode of the transmitter.

In a first aspect of the third embodiment, a system further includes a switch arranged between the memory and the patterned data signal input for intermittently communicating the patterned data signal to the patterned data signal input.

In a second aspect of the third embodiment, in combination with the third embodiment and/or aspects thereof, a processor includes at least one of the memory and transmitter. In a third aspect of the third embodiment, in combination with the third embodiment and/or aspects thereof, the memory includes a processor register that contains the data for generating the patterned data signal.

In a fourth aspect of the third embodiment, the system further includes a serializer operably coupled to the processor register and the second input, the serializer adapted to serialize the data for generating the patterned data signal. In a fifth aspect of the third embodiment, in combination with the third embodiment and/or aspects thereof, the multiplexer includes a 2-to-1 multiplexer.

In a sixth aspect of the third embodiment, in combination with the third embodiment and/or aspects thereof, the system further includes a mode selection controller adapted to provide, based on the digital data signal, the mode selection signal. In a seventh aspect of the third embodiment, the mode selection controller is adapted to provide, in response to the digital data signal including a flow control message indicating the idle mode, the mode selection signal. In an eighth aspect of the third embodiment, the mode selection controller is adapted to provide, in response to the digital data signal including a flow control message indicating the data signal transmission mode, the mode selection signal.

In a ninth aspect of the third embodiment, in combination with the third embodiment and/or aspects thereof, the transmitter is arranged to transmit, as the digital data signal, a clockless data signal. In a tenth aspect of the third embodiment, in combination with the third embodiment and/or aspects thereof, the memory includes a programmable memory arranged for receiving the data for generating the patterned data signal.

According to a fourth embodiment of the present invention, a system includes a first inverter that is arranged for receiving a digital data signal, a clock, a first counter operably coupled to the clock, and a transmitter multiplexer, the transmitter multiplexer including: a first input arranged for receiving the digital data signal, a first inverted data input operably coupled to the first inverter and arranged for receiving an inverted digital data signal, a first selection signal input operably coupled to the first counter and arranged for receiving a first selection signal, and a first output arranged for transmitting a transmitter multiplexer output signal, the first counter adapted to provide the first selection signal in response to a threshold number of counted clock cycles, thereby the transmitter multiplexer alternately transmitting, as the transmitter multiplexer output signal, the digital data signal and the inverted digital data signal.

In a first aspect of the fourth embodiment, the system further includes a second inverter arranged to receive the transmitter multiplexer output signal, a second counter, a receiver multiplexer, and a data link operably coupled to the transmitter multiplexer and the receiver multiplexer, the receiver multiplexer including a second input arranged for receiving the transmitter multiplexer output signal, a second inverted data input operably coupled to the second inverter and arranged for receiving an inverted transmitter multiplexer output signal, a second selection signal input operably coupled to the second counter and arranged for receiving a second selection signal, and a second output arranged for providing a receiver multiplexer output signal, the second counter adapted to provide the second selection signal in response to the threshold number of counted clock cycles, thereby the receiver multiplexer alternately providing, as the receiver multiplexer output signal, the transmitter multiplexer output signal and the inverted transmitter multiplexer output signal.

In a second aspect of the fourth embodiment, in combination with the fourth embodiment and/or aspects thereof, the system further includes a processor operably coupled to a computer-readable storage medium having computer-readable program code embodied therewith, the computer-readable program code executable by the processor to synchronize the first and second counters.

In a third aspect of the fourth embodiment, in combination with the fourth embodiment and/or aspects thereof, a first processor includes the transmitter multiplexer and a second processor includes the receiver multiplexer.

In a fourth aspect of the fourth embodiment, in combination with the fourth embodiment and/or aspects thereof, the first counter is a programmable counter adapted to change the threshold number of counted clock cycles that the programmable counter responds to for providing the first selection signal. In a fifth aspect of the fourth embodiment, in combination with the fourth embodiment and/or aspects thereof, the first counter is a first programmable counter adapted to change the threshold number of counted clock cycles that the first programmable counter responds to for providing the first selection signal and the second counter is a second programmable counter adapted to change the threshold number of counted clock cycles that the second programmable counter responds to by providing the second selection signal.

As described herein, the third and fourth embodiments and aspects thereof may be combined in further embodiments.

BRIEF DESCRIPTION OF THE DRAWINGS

FIG. 7 depicts an example method for data communication.

DETAILED DESCRIPTION

Figure 1:
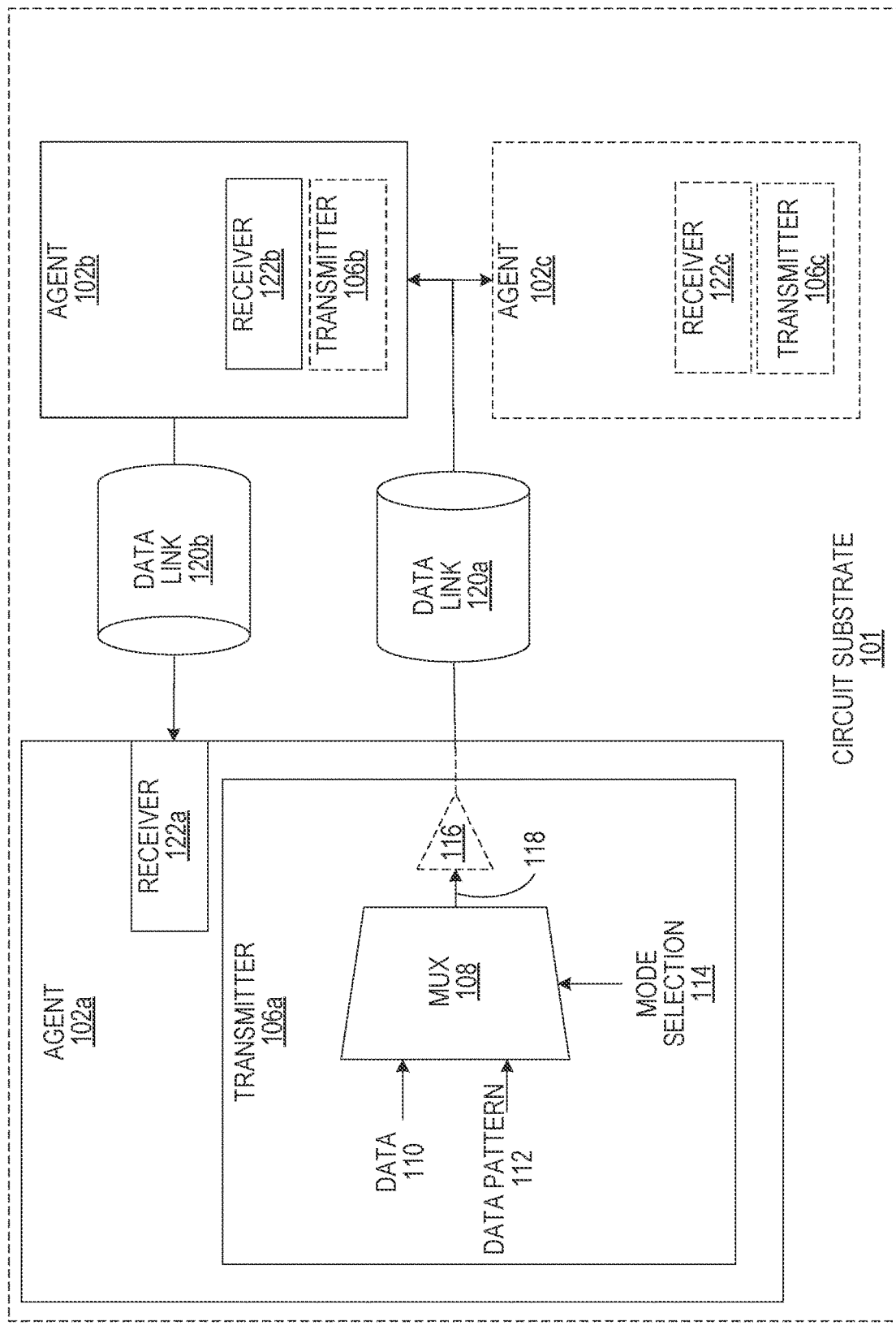
FIG. 1 depicts examples of a communication system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Idle agents (e.g., processors) operate on aggressively small power budgets. This causes a large delta in the current on the I/O voltage supply when going from an idle to active state. This delta in current translates to a large voltage noise because of package inductance. This voltage noise will cause a degradation in performance in either the I/O creating the noise or in other I/Os that are operably coupled to the same power supply. In one aspect, some embodiments may effectively provide a data link noise ceiling by ensuring a minimal switching activity is occurring over a data link.

Power consumption of a digital circuit may be characterized in terms of a switching activity of a digital signal (e.g., a digital data signal or a clock signal). Switching activity may be characterized as an activity factor (e.g., a switching activity value) of a digital signal that has a probability for a power-consuming transition per clock cycle of the digital signal. A clock signal has an activity factor, expressed as a percentage, of 100%, in contrast to a digital data signal with an activity factor between 5% and 15%, which means that the digital data signal will include a power-consuming transition during 5% to 15% of the clock cycles.

With reference now to FIG. 1, communication system 100 includes, in an embodiment, a circuit substrate 101 with agents 102a and 102b and optional agent 102c. Agent 102a includes transmitter 106a and receiver 122a. Agent 102b includes transmitter 106b and receiver 122b and optional agent 102c includes transmitter 106c and receiver 122c.

Transmitters 106a and 106b and receivers 122a 122b may communicate over respective data links 120a and 120b. In one aspect, data links 120a and 120b may be a clockless data links (e.g., a data link that does not carry data with an embedded clock signal).

Transmitter 106a and receiver 122a may be included in processors that occupy a computer motherboard, where data link 26 is a bus that interconnects processors. Alternatively, transmitter 106a and receiver 122a could be arranged within separate chips that are respectively located on respective circuit boards. Transmitter 106a and receiver 122a may be in close proximity to one another or further away, such as with signal traces of 100 inches or longer. In one aspect, transmitter 106a and receiver 122a may reside on a multi-chip package. In one aspect, data links 120a and 120b include one or more physical interconnects (e.g., a point-to-point physical interconnect), thereby defining a physical link at the physical layer of system 100.

Multiplexer 108, in one embodiment, includes digital data input 110, data pattern input 112, mode selection input 114, and digital data output 118. Digital data output 118 may be operably coupled with Tx circuitry 116. In one aspect, input 110 may receive a digital data signal for transmitting over data link 120a. In one aspect, mode selection input 114 may receive a signal that indicates that transmitter 106a is in an idle mode.

Any of several criteria can be used to initiate this idle mode. Example embodiments include a trigger condition for initiating the idle mode such as detecting an idle flit, an output signal below a switching activity threshold, and an empty transaction queue for a transmitting agent or if said queue reaches a non-zero minimum threshold. Additionally or alternatively, the trigger condition may reflect a software-triggered event, an event triggered by a higher protocol layer, and/or a power management event.

Upon receiving an idle mode selection signal by input 114, multiplexer 108 transmits a data pattern that is received via data pattern input 112. In one aspect, the data pattern is based on predetermined data for guaranteeing a minimum switching activity over data link 120a. As such, the data pattern does not include actual data for processing, but rather data for ensuring a maximum noise level or noise ceiling of data link 120a and operably coupled agents. In one aspect, transmitted data patterns are not processed by receiving agents.

Upon input 114 receiving a selection signal that indicates a data signal transmission mode for transmitter 106a, multiplexer 108 transmits the digital data signal received by digital data input 110 to at least agent 102b. In some embodiments, multiplexer 108 is a 2-to-1 multiplexer.

Figure 2:
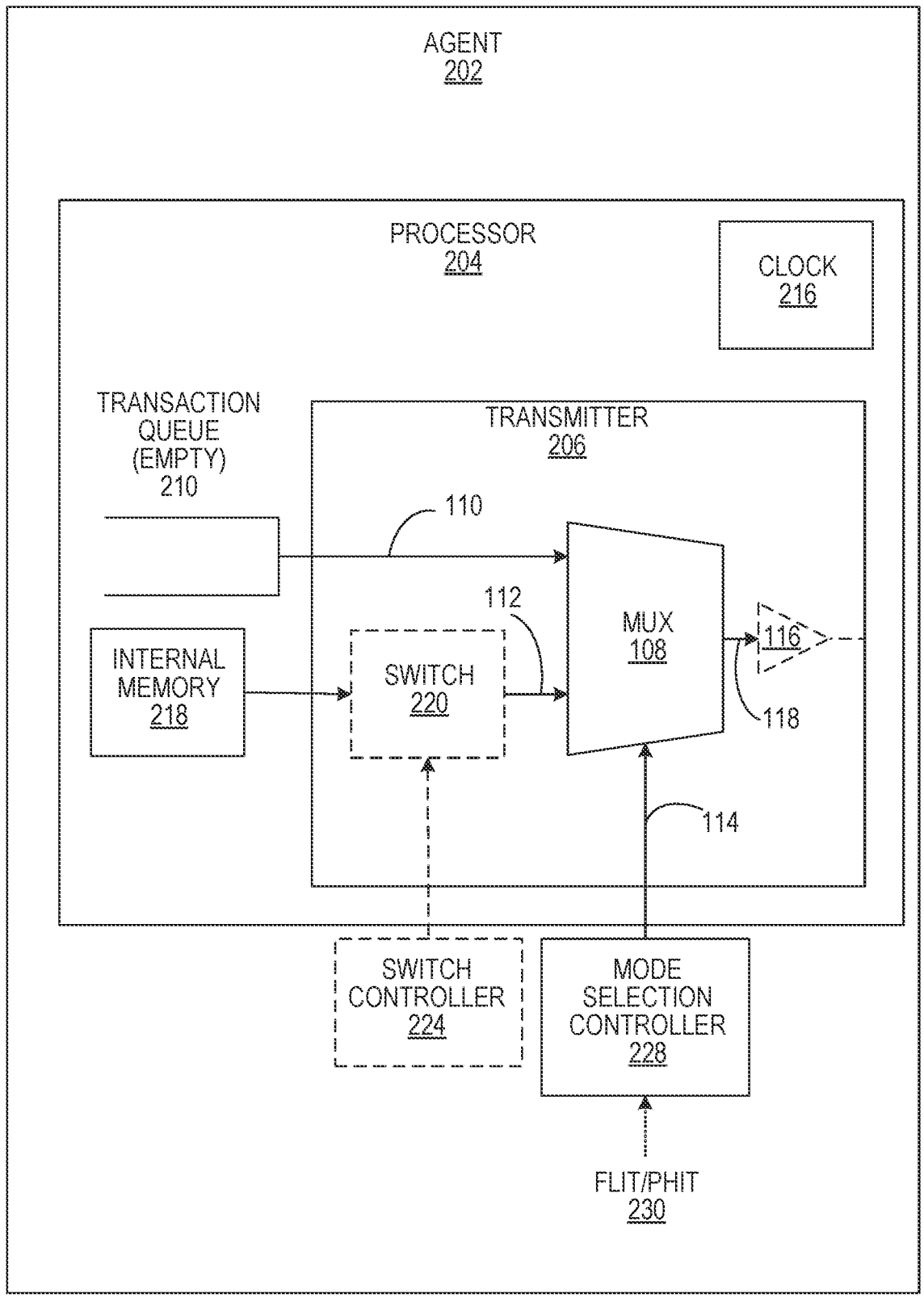
FIG. 2 depicts examples of a transmitter agent.

FIG. 2 shows agent 202 that includes, in an embodiment, processor 204, optional switch controller 224, and mode selection controller 228. In one embodiment, processor 204 includes switch controller 224, and mode selection controller 228.

In an embodiment, processor 204 includes multiplexer 108 with the above-mentioned digital data input 110, data pattern input 112, mode selection input 114, and digital data output 118. In one embodiment, processor 204 may further include clock 216 and internal memory 218. Internal memory 218 may include data for generating a patterned data signal. In some embodiments, internal memory 218 include programmable memory, thereby allowing for the patterned signal data to be changed and/or supplemented.

For example, processor 204 may be included in a wide range of different computing systems and subsystems, each with differing noise ceiling thresholds for transmitted data to not be corrupted via voltage noise. For different computing systems/subsystems, different patterned signal data may be provided to memory 218 such that different noise ceiling thresholds may be accommodated. In some embodiments, the different patterned signal data characterizes patterned data signals with differing activity factors. In programmable memory embodiments of internal memory 218, a programmable communication protocol is achieved by programmably defining patterned signal data.

In one embodiment, internal memory 218 may be relatively small (e.g., an embodiment shown in FIG. 3) and contain a small range of data values with a relatively high activity factor for an idle mode. For example, a patterned data signal may have an activity factor of no lower than 6%. In one embodiment, switch 220 toggles the application of the patterned data signal to input 112, thereby reducing the activity factor. In one aspect switch 220 decreases the activity factor by around half such that a signal with a 6% activity factor has an activity factor of around 3.25%.

In one embodiment, switch controller 224 is adapted to control the application and/or switching rate of switch 220. A variable switching rate may further provide, to input 112, patterned data input signals of differing activity factors. For example, in some embodiments, switch controller 224 may increase or decrease the switching speed of switch 220 for intermittently providing a patterned data signal. In one embodiment, at least one of the switch 220 and switch controller 224 is programmable, thereby allowing for at least one instruction for defining a switching rate, among other possible instructions.

In one embodiment, mode selection controller 228 may detect flit or phit 230. "FLIT" stands for "flow control unit/digit" and "PHIT" stands for "physical digit". The smallest unit of information transferred to/from a link layer is referred to as a "flit." The smallest unit of data transferred from one agent to another at the physical layer is referred to as a "phit."

Not sending any data across a data link during an idle mode may result in an arbitrary voltage (e.g., noise) on the data link. In contrast, in one embodiment flit/phit 230 may include one of an idle flit and idle phit. In some embodiments, mode selection controller 228 may detect an idle flit and/or an idle phit, which is indicative of an idle mode of transmitter 206 and/or processor 204, and, in response, provide an idle mode selection signal, thereby causing multiplexer 108 to transmit a patterned data signal.

In one embodiment, mode selection controller 228 may monitor a transaction queue 210 and/or data therein. In one embodiment, controller 228 provides an idle mode selection signal in response to an empty and/or near-empty transaction queue 210.

Figure 3:
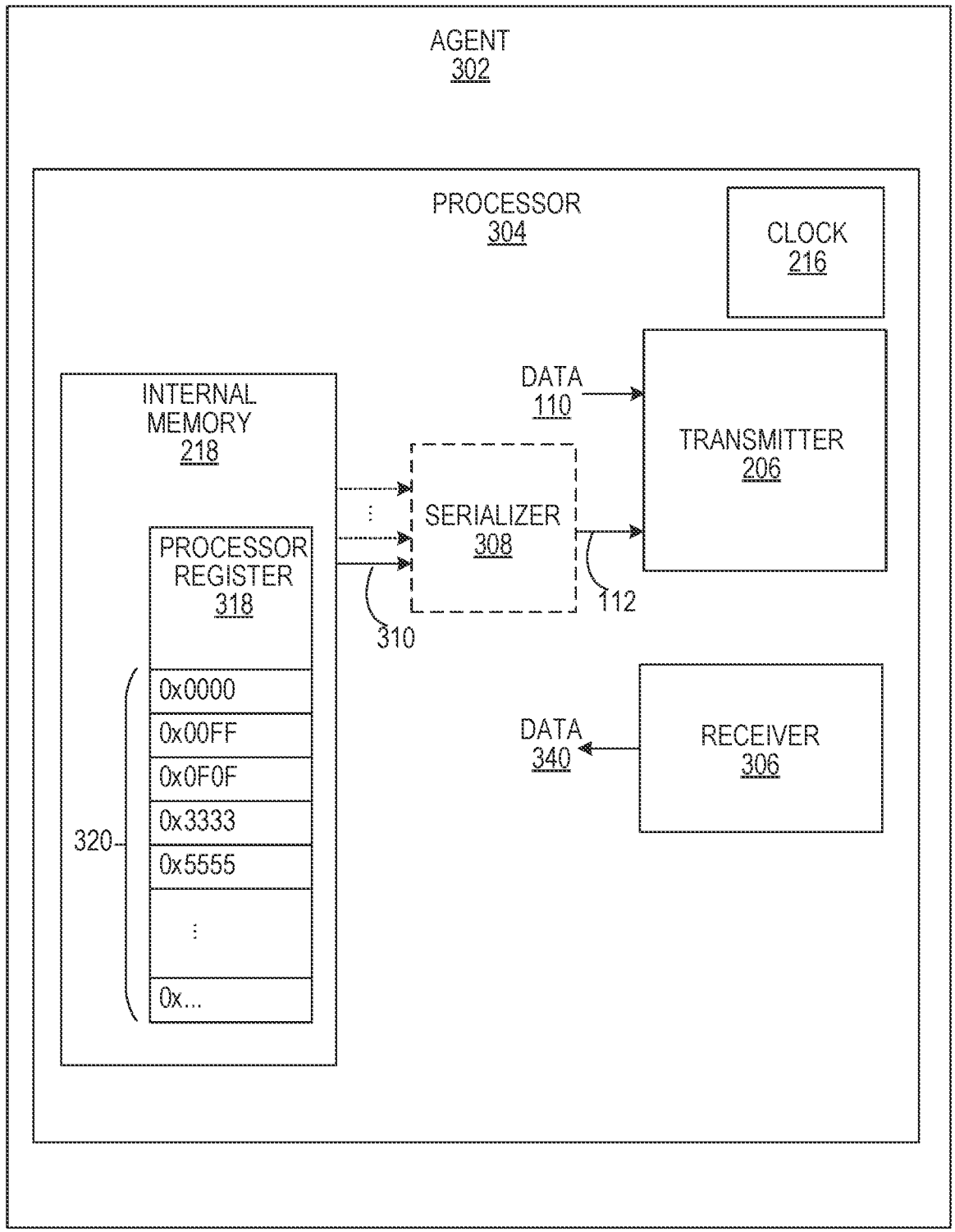
FIG. 3 depicts an example of a transmitter agent.

FIG. 3 shows agent 302 that includes, in an embodiment, processor 304 with transmitter 206, clock 216, receiver 306, serializer 308, and internal memory 218. In an embodiment, internal memory 218 includes processor register 318 for containing (or otherwise storing) data 320 for generating a patterned data signal. In one embodiment, processor register 318 may include 16-bit data, shown in a hexadecimal format in FIG. 3. In one aspect, storing data 320 in processor register 318 is a particularly efficient implementation in terms of memory utilization, computational resources, and messaging efficiency for providing a patterned data signal during an idle mode.

Optional serializer 308 may receive, in parallel, data 320 via input(s) 310 and serialize data 320 as the patterned data signal for input 112. That is, serializer 308 may include a Parallel In Serial Out (PISO) block structure. In one aspect, serializer 308 may be a component of a SerDes (i.e., a Serializer/Deserializer). Alternatively, data 320 may be directly outputted from memory 218 to input 112 in a serial manner.

In an embodiment, processor 304 may still receive and process data received from data output 340 even if transmitter 206 is in an idle mode. That is, in some embodiments, transmitter 206 and receiver 306 may be independently idled.

Figure 4:
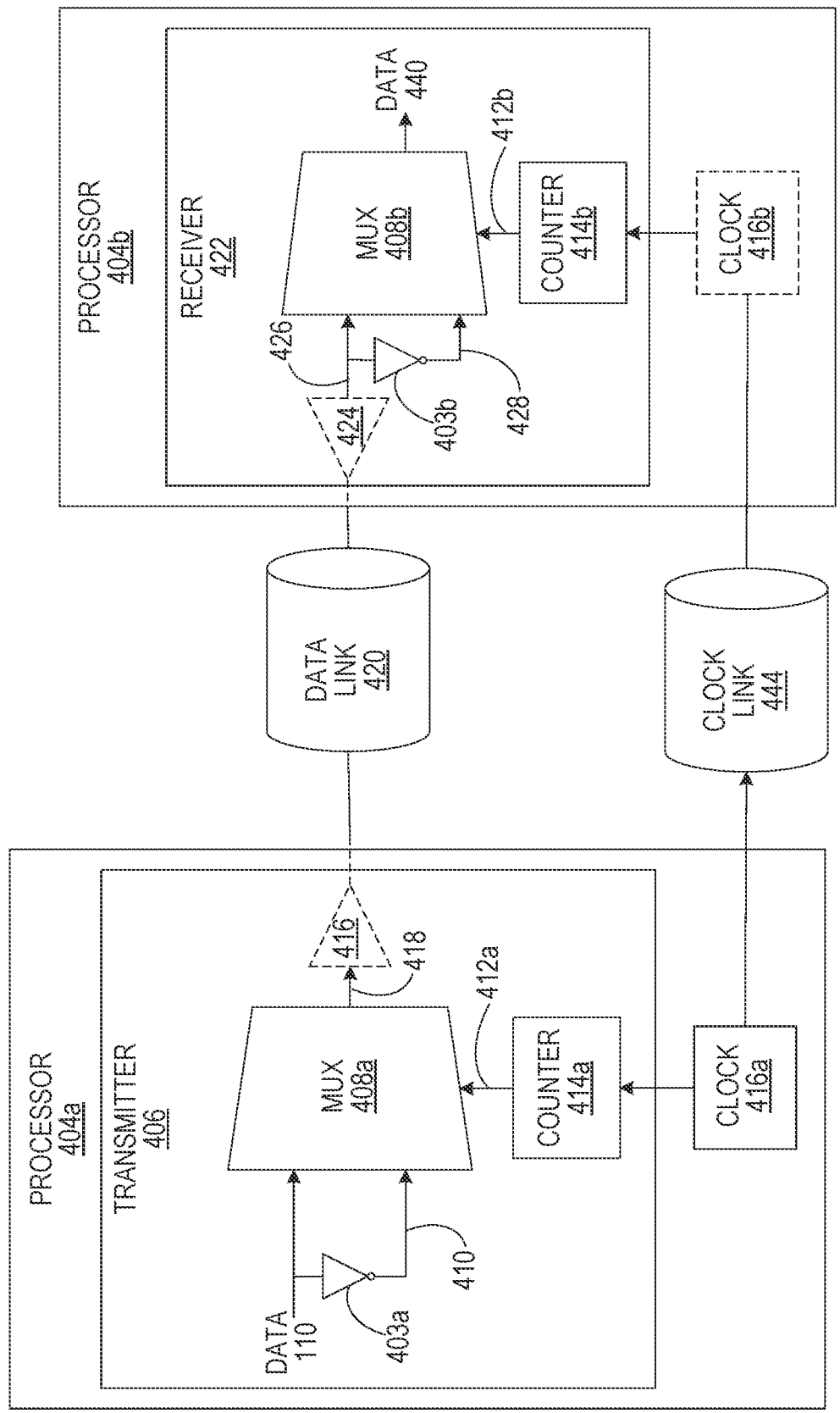
FIG. 4 depicts examples of a communication system.

FIG. 4 depicts examples of communication system 400, which includes, in an embodiment, processors 404a and 404b, data link 420, and clock link 444. In one embodiment, data link 420, and/or clock link 444 include one or more physical interconnects (e.g., a point-to-point physical interconnect), thereby defining a physical link at the physical layer of system 400.

In FIG. 4, system 400 depicts a "source synchronous" clocking scheme embodiment, but other embodiments may include "common clock" scheme embodiments. For example, clock 416a may reside externally to processor 404a, with clock 416a providing a clock signal to processors 404a and 404b.

Processor 404a, in an embodiment, includes transmitter 406 and clock 416a. Transmitter 406 includes, in an embodiment, inverter 403a, multiplexer 408a, counter 414a, and Tx circuitry 416. Multiplexer 408a (e.g., a transmitter multiplexer) includes digital data input 110, inverted data input 410, selection signal input 412a, and data output 418.

Processor 404b, in an embodiment, includes receiver 422 and optional clock 416b. In one embodiment, clock 416b receives a clock signal for generating a further clock signal. In one embodiment, processor 404b does not include clock 416b and utilizes an external clock signal.

Receiver 422 includes, in an embodiment, inverter 403b, multiplexer 408b, counter 414b, and Rx circuitry 424. Multiplexer 408b (e.g., a receiver multiplexer) includes digital data input 426, inverted data input 428, selection signal input 412b, and data output 440. In some embodiments, multiplexers 408a and 408b are 2-to-1 multiplexers.

In one embodiment, counters 414a and 414b are synchronized and transmit a selection signal to the respective multiplexer 408a and 408b after a threshold number of clock cycles of at least clock 416a. In one aspect, multiplexers 408a and 408b synchronously switch from outputting data or inverted data. For example, in one embodiment mode, data provided to data input 110 of transmitter 406 will be provided over data link 420, received by data input 426, and provided by data output 440. In another embodiment mode, counters 414a and 414b synchronously provide (e.g., transmit) a selection signal to respective selection signal inputs 412a and 412b such that multiplexers 408a and 408b synchronously switch to outputting an inverted data signal provided on respective inverted data inputs 410 and 428.

In inverted mode embodiments, the original data signal is inverted twice (e.g., first by inverter 403a and then by 403b), thereby providing an accurate data signal by output 440. In one advantageous aspect, a minimum activity factor (and thus a noise ceiling) can be established because either the data signal or the inverted data signal is provided independently of data content. For example, actual data may include long strings of 0s or 1s, which may bias circuits or otherwise introduce noise. However, in some embodiments, at least one portion of said long strings of 0s or 1s may be inverted, thereby increasing a data signal's activity factor.

In another advantageous aspect, toggling between data signals and inverted data signals may maintain circuit health. For example, by guaranteeing a minimum amount of switching every threshold number of clock cycles, circuit components are more likely to stay within design tolerances with minimum power consumption, particularly in embodiments with extended periods of minimal-to-no data transmission (e.g., a processor with extended periods of an empty transaction queue).

In one embodiment, counters 414a and 414b are programmable. For example, in an embodiment, counters 414a and 414b may be adapted to change, via instructions, the threshold number of counted clock cycles that triggers a selection signal. An example threshold value may be thirty-two thousand clock cycles, which may be updated, in programmable embodiments, to a different clock cycle value. In programmable embodiments of counters 414a and 414b, a programmable communication protocol is achieved by programmably defining a clock cycle number that triggers, for example, counters 414a and 414b for synchronously transmitting respective selection signals.

System 400 may be included in a wide range of different computing systems and subsystems, each with differing noise ceiling thresholds for transmitted data to not be corrupted via voltage noise. For different computing systems/subsystems, different triggering clock cycle values may be provided to clocks 416a and 416b such that different noise ceiling thresholds may be accommodated.

Figure 5:
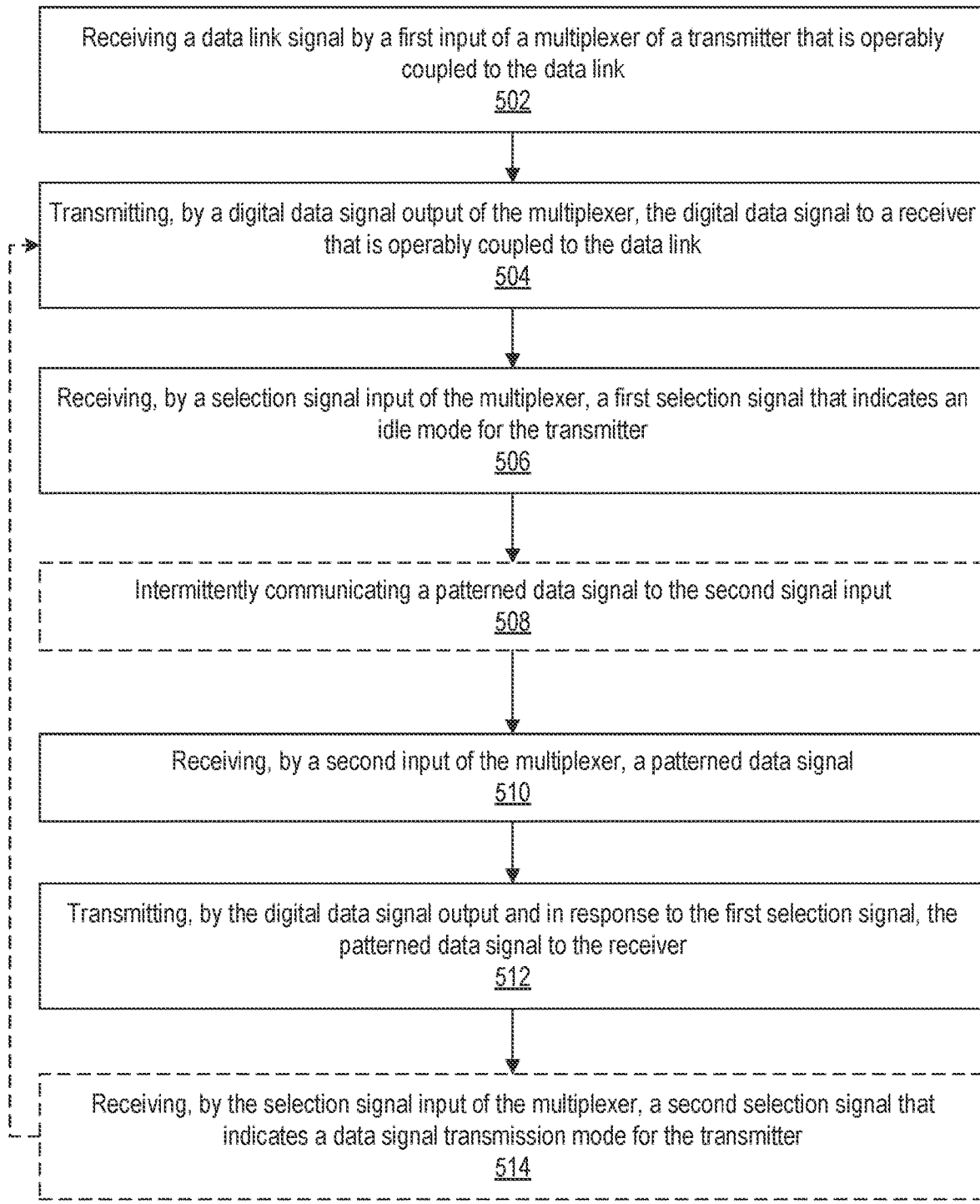
FIG. 5 depicts example methods for data communication.

FIG. 5 depicts example method 500 for data communication and includes, in an embodiment, the shown steps. Method 500, in some embodiments, may correspond to agent 102a of FIG. 1, agent 202 of FIG. 2, and/or agent 302 of FIG. 3.

Step 502 includes receiving a data link signal by a first input of a multiplexer of a transmitter that is operably coupled to a data link. Step 504 includes transmitting, by a digital data signal output of the multiplexer, the digital data signal to a receiver that is operably coupled to the data link.

Step 506 includes receiving, by a selection signal input of the multiplexer, a first selection signal that indicates an idle mode for the transmitter. In some embodiments, an idle mode may be selected based on the digital data signal such as a switching activity value of the digital data signal and/or detecting at least one of an idle flit and idle phit.

Optional step 508 includes intermittently communicating a patterned data signal to the second signal input. As explained with reference to FIG. 2, a switch may intermittently couple or otherwise communicate the patterned data signal. In some embodiments, step 508 modifies a patterned data signal's switching activity, including decreasing the patterned data signal's activity factor.

Step 510 includes receiving, by a second input of the multiplexer, a patterned data signal. Step 512 includes transmitting, by the digital data signal output and in response to the first selection signal, the patterned data signal to the receiver. Optional step 514 includes receiving, by the selection signal input of the multiplexer, a second selection signal that indicates a data signal transmission mode for the transmitter. Method 500 may then, in an embodiment, return to step 504, which is associated with a data signal transmission mode.

Figure 6:
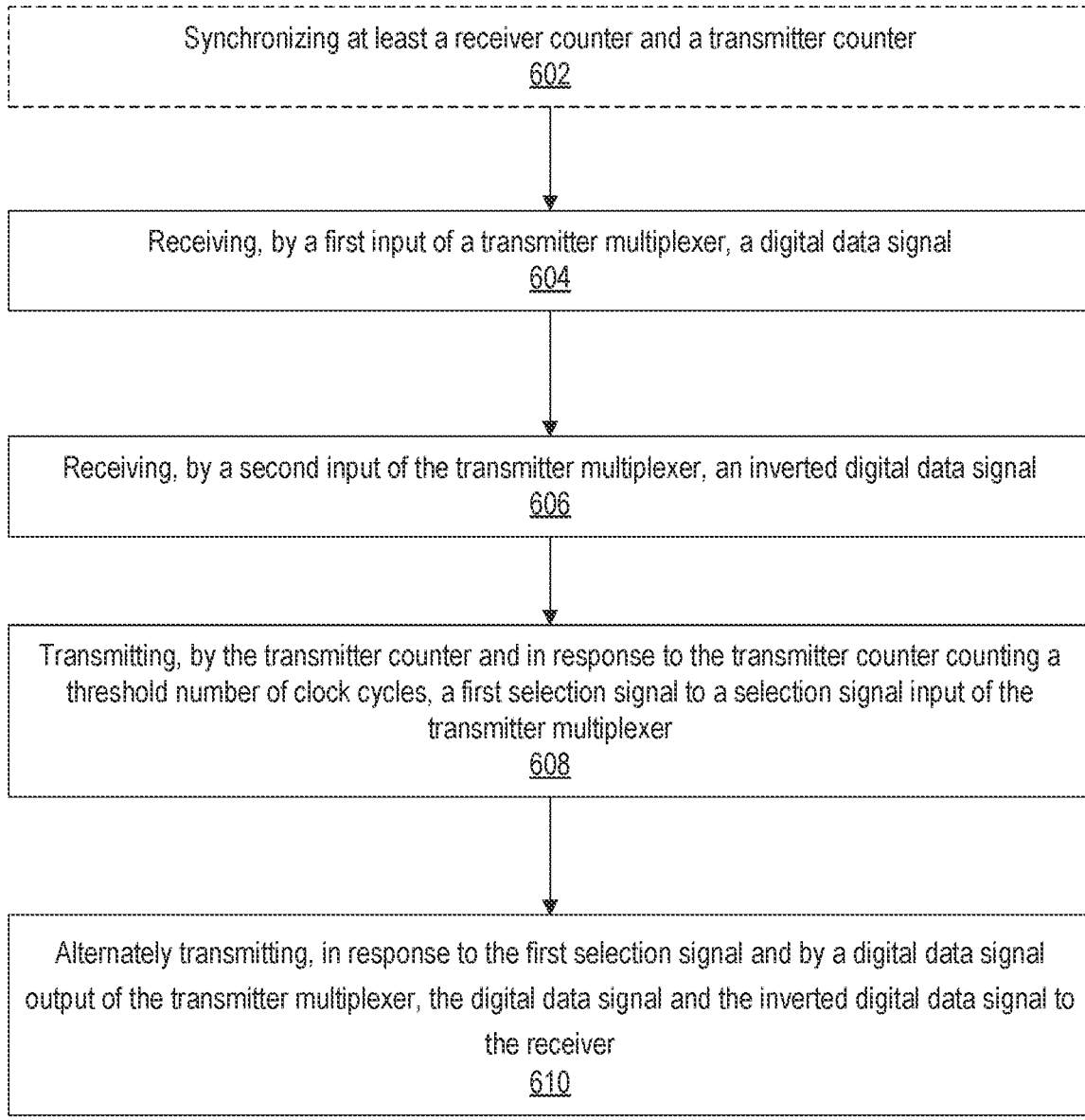
FIG. 6 depicts example methods for data communication.

FIG. 6 depicts example method 600 for data communication and includes, in an embodiment, the shown steps. Method 600, in some embodiments, may correspond to communication system 400. Optional step 602 includes synchronizing at least a receiver counter and a transmitter counter. For example, a memory may include computer program instructions that are executable by a processor for synchronizing two or more counters. In some embodiments, said counters may already be synchronized so that an embodiment method may being at step 604.

Step 604 includes receiving, by a first input of a transmitter multiplexer, a digital data signal. Step 606 includes receiving, by a second input of the transmitter multiplexer, an inverted digital data signal. Step 608 includes transmitting, by the transmitter counter and in response to the transmitter counter counting a threshold number of clock cycles, a first selection signal to a selection signal input of the transmitter multiplexer. In some embodiments, counting includes counting each occurrence of the threshold number of counted clock cycles and provide the selection signal of step 608 in response to each occurrence of the threshold number of counted clock cycles.

Step 610 includes alternately transmitting, in response to the first selection signal and by a digital data signal output of the transmitter multiplexer, the digital data signal and the inverted digital data signal to the receiver. As explained above, some embodiment communication systems (e.g., system 400) may toggle between transmitting data and transmitting inverted data, independently of an idle mode or data signal transmission mode.

FIG. 7 depicts example method 700 for data communication and includes, in an embodiment, the shown steps. Method 700, in some embodiments, may correspond to communication system 400. Method 700 may include step 610. Step 702 includes alternately receiving, by a first input of a receiver multiplexer, the digital data signal and the inverted digital data signal from the transmitter. Step 704 includes receiving, by a second input of a receiver multiplexer, an inverted signal version of the digital data signal or the inverted digital data signal that was received in step 702.

Step 706 includes transmitting, by the receiver counter and in response to the receiver counter counting a threshold number of clock cycles, a second selection signal to a selection signal input of the receiver multiplexer. In some embodiments, step 706 may synchronously occur with step 608 of method 600 such that a transmitter and receiver alternately process a data input signal or an inverted data input signal. In some embodiments, counting includes counting each occurrence of the threshold number of counted clock cycles and provide the selection signal of step 706 in response to each occurrence of the threshold number of counted clock cycles.

Step 708 includes providing, in response to the second selection signal and by a digital data signal output of the multiplexer, the digital data signal. In one aspect, the digital data signal of step 604 is faithfully reproduced as the digital data signal of step 708 given that the receiving and transmitting counters are synchronized.

Figure 8:
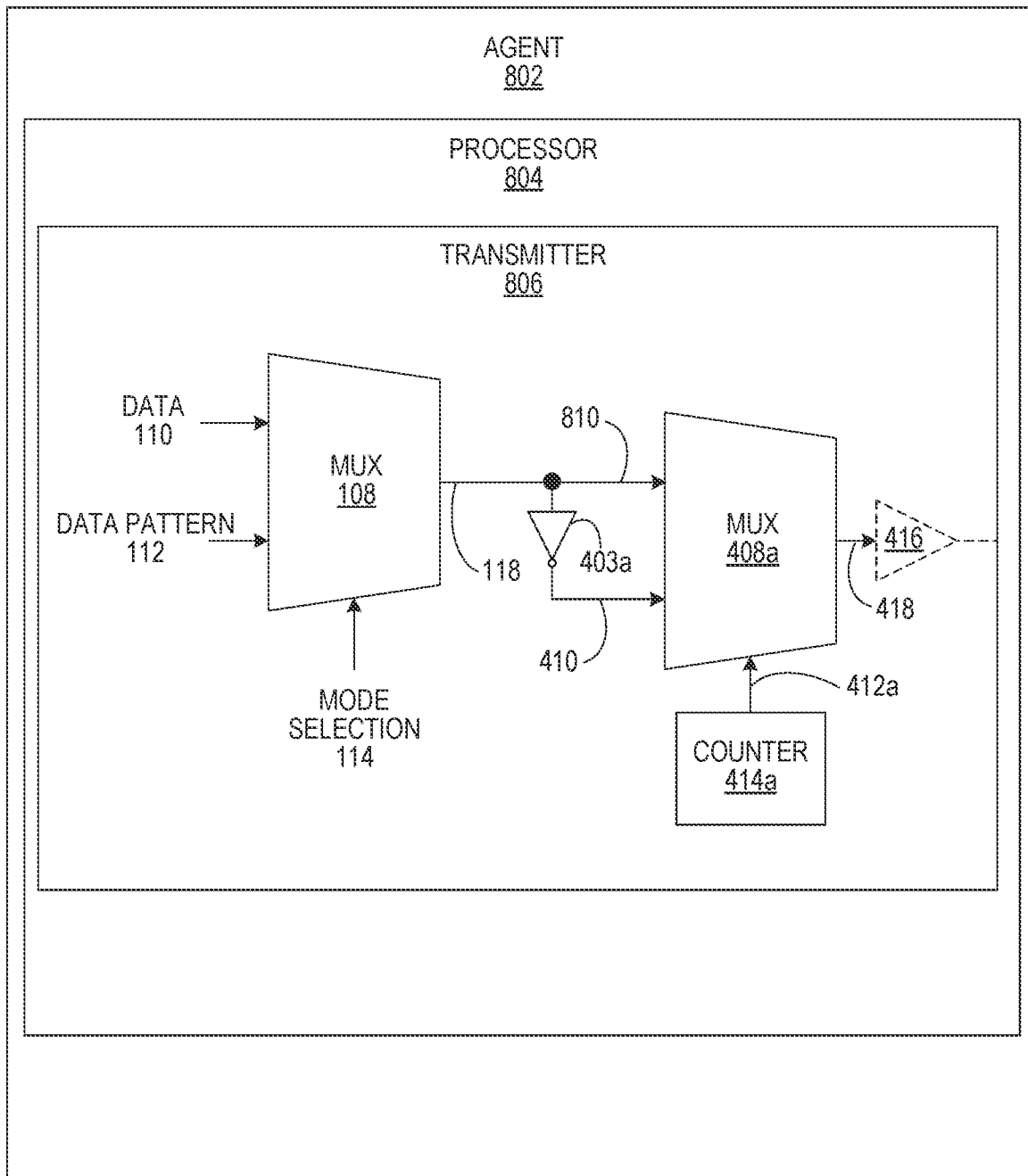
FIG. 8 depicts an example of a transmitter agent.

With reference now to FIG. 8, agent 802 includes, in an embodiment, processor 804 and transmitter 806. In an embodiment, transmitter 806 includes multiplexer 108 of FIG. 1 operably coupled to multiplexer 408a of FIG. 4. In such embodiments, digital data output 118 provides an (actual) data signal or a patterned data signal based on an idle mode or a data signal transmission mode, as discussed above, to digital data input 810 and inverted data input 410 of multiplexer 408a as a received digital data signal. As discussed above, multiplexer 408a alternately provides the received digital data signal or an inverted digital data signal to digital data output 418 based on counter 414a counting a threshold number of clock cycles. As such, agent 902, in some embodiments, combines features of FIGS. 1 and 4 and advantageous thereof.

Computing environment 900 contains an example of an environment for the execution of at least some of the computer code involved in performing the inventive methods, such as programmable communication protocol code block 1000. In addition to block 1000, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 1000, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

Figure 9:
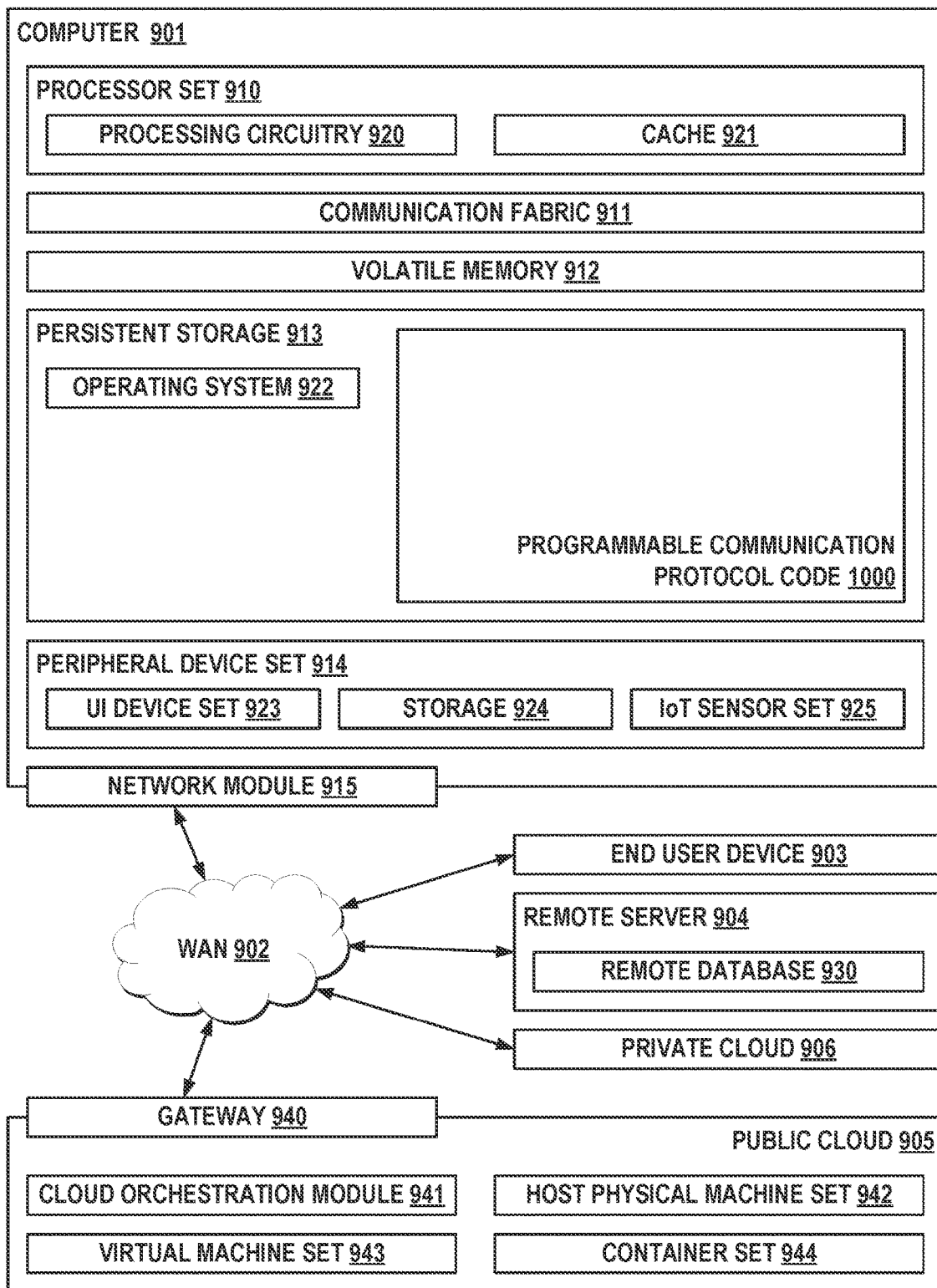
FIG. 9 depicts an example computing environment.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 1000 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 1000 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a digital data signal by a first data input of a transmitter multiplexer;
   inverting the digital data signal by a first inverter, thereby providing an inverted digital data signal;
   receiving the inverted digital data signal by a first inverted data input of the transmitter multiplexer;
   counting, by a first counter, a clock signal;
   transmitting, by the first counter and in response to the first counter counting a threshold number of clock cycles, a first selection signal to a first selection signal input of the transmitter multiplexer;
   alternately transmitting, in response to the first selection signal and by a first digital data signal output of the transmitter multiplexer, the digital data signal and the inverted digital data signal as the transmitter output signal to a receiver, the receiver and the digital data signal output operably coupled to a data link; and
   synchronizing the first counter with a second counter of the receiver.

2. The method of claim 1, wherein the receiver comprises the second counter and a receiver multiplexer arranged for receiving the transmitter output signal, the method further comprising:
   receiving the transmitter output signal by a second data input of the receiver multiplexer;
   inverting, by a second inverter, the transmitter output signal, thereby providing an inverted transmitter output signal;
   receiving the inverted digital data signal by a second inverted data input of the receiver multiplexer;
   counting, by the second counter, the clock signal;
   transmitting, by the second counter and in response to the second counter counting the threshold number of clock cycles, a second selection signal to a second selection signal input of the receiver multiplexer; and
   alternately providing, in response to the second selection signal and by a second digital data signal output of the receiver multiplexer, the transmitter output signal and the inverted transmitter output signal.

3. The method of claim 1, wherein the counting step by the first counter comprises counting, by the first counter, each occurrence of the threshold number of counted clock cycles and provide the first selection signal in response to each occurrence of the threshold number of counted clock cycles.

4. The method of claim 2, wherein the counting step by the first counter comprises counting, by the first counter, each occurrence of the threshold number of counted clock cycles and provide the first selection signal in response to each occurrence of the threshold number of counted clock cycles and the counter step by the second counter comprising counting, by the second counter, each occurrence of the threshold number of counted clock cycles and provide the second selection signal in response to each occurrence of the threshold number of counted clock cycles.

5. The method of claim 1, wherein a first processor comprises the transmitter multiplexer.

6. The method of claim 2, wherein a first processor comprises the transmitter multiplexer and a second processor comprises the receiver multiplexer.

7. The method of claim 1, further comprising:
   receiving the digital data signal by a first input of a multiplexer;
   transmitting, by an output of the multiplexer, the digital data signal to the transmitter multiplexer;
   receiving, by a selection signal input of the multiplexer, a first selection signal that indicates an idle mode;
   receiving, by a second input of the multiplexer, a patterned data signal; and
   transmitting, as the digital data signal and by the output of the multiplexer, the patterned data signal to the transmitter multiplexer in response to the first selection signal.

8. A system comprising:
   a first inverter that is arranged for receiving a digital data signal, a clock, a first counter operably coupled to the clock, and a transmitter multiplexer, the transmitter multiplexer comprising:
   a first input arranged for receiving the digital data signal,
   a first inverted data input operably coupled to the first inverter and arranged for receiving an inverted digital data signal,
   a first selection signal input operably coupled to the first counter and arranged for receiving a first selection signal, and
   a first output arranged for transmitting a transmitter multiplexer output signal,
   the first counter adapted to provide the first selection signal in response to a threshold number of counted clock cycles, thereby the transmitter multiplexer alternately transmitting, as the transmitter multiplexer output signal, the digital data signal and the inverted digital data signal to a second inverter, and
   the first counter synchronized to a second counter of the second inverter.

9. The system of claim 8, further comprising the second inverter arranged to receive the transmitter multiplexer output signal, the second counter, a receiver multiplexer, and a data link operably coupled to the transmitter multiplexer and the receiver multiplexer, the receiver multiplexer comprising:
   a second input arranged for receiving the transmitter multiplexer output signal, a second inverted data input operably coupled to the second inverter and arranged for receiving an inverted transmitter multiplexer output signal, a second selection signal input operably coupled to the second counter and arranged for receiving a second selection signal, and a second output arranged for providing a receiver multiplexer output signal, the second counter adapted to provide the second selection signal in response to the threshold number of counted clock cycles, thereby the receiver multiplexer alternately providing, as the receiver multiplexer output signal, the transmitter multiplexer output signal and the inverted transmitter multiplexer output signal.

10. The system of claim 8, wherein a first processor comprises the transmitter multiplexer.

11. The system of claim 9, wherein a first processor comprises the transmitter multiplexer and a second processor comprises the receiver multiplexer.

12. The system of claim 10, wherein the first processor further comprises the first inverter, the clock, and the first counter.

13. The system of claim 11, wherein the first processor further comprises the first inverter, the clock, and the first counter and the second processor further comprises the second inverter and the second counter.

14. The system of claim 8, wherein the first counter is a programmable counter adapted to change the threshold number of counted clock cycles that the programmable counter responds to for providing the first selection signal.

15. The system of claim 9, wherein the first counter is a first programmable counter adapted to change the threshold number of counted clock cycles that the first programmable counter responds to for providing the first selection signal and the second counter is a second programmable counter adapted to change the threshold number of counted clock cycles that the second programmable counter responds to by providing the second selection signal.

16. The system of claim 8 further comprising:

a memory that contains data for generating a patterned data signal; and a first multiplexer that comprises:

a data signal input arranged for receiving the digital data signal, a patterned data signal input arranged for receiving the patterned data signal, a selection signal input arranged for receiving a mode selection signal, and a digital data signal output arranged for transmitting a first multiplexer output signal to the first input and the first inverted data input of the transmitter multiplexer, the first multiplexer adapted to selectively output the digital data signal and the patterned data signal as the multiplexer output signal in response to receiving the mode selection signal, the mode selection signal representative of an idle mode and a data signal transmission mode.

17. The system of claim 16, wherein a processor comprises the transmitter multiplexer, the first multiplexer, and the memory.

18. The system of claim 17, wherein the memory includes a processor register that contains the data for generating the patterned data signal.

* * * * *